United States Patent [19]

Foss et al.

[11] Patent Number: 5,404,534
[45] Date of Patent: Apr. 4, 1995

[54] METHOD AND APPARATUS FOR EXTENSIBLE OBJECT-ORIENTED INTER-APPLICATION LINK MANAGEMENT

[75] Inventors: Carolyn L. Foss, Palo Alto; Dwight F. Hare, Menlo Park; Richard F. McAllister, Palo Alto; Tin A. Nguyen, Danville; Amy Pearl, Mountain View; Sami Shaio, Palo Alto, all of Calif.

[73] Assignee: Sun Microsystems, Inc., Mountain View, Calif.

[21] Appl. No.: 252,059

[22] Filed: Jun. 1, 1994

Related U.S. Application Data

[63] Continuation of Ser. No. 657,159, Feb. 15, 1991, abandoned.

[51] Int. Cl.$^6$ .............................................. G06F 3/00
[52] U.S. Cl. ........................... 395/700; 397/650; 397/725; 364/DIG. 1; 364/222.1; 364/280; 364/284; 364/284.3
[58] Field of Search ................................ 395/650, 700

[56] References Cited

U.S. PATENT DOCUMENTS

| 4,412,285 | 10/1983 | Neches et al. | 364/200 |
| 4,982,344 | 1/1991 | Jordan | 364/521 |
| 5,060,150 | 10/1991 | Simor | 364/200 |
| 5,095,522 | 3/1992 | Fujita et al. | 395/200 |
| 5,179,708 | 1/1993 | Gyllstrom et al. | 395/725 |
| 5,212,792 | 5/1993 | Gerety et al. | 395/650 |

FOREIGN PATENT DOCUMENTS

| 0369961 | 5/1990 | European Pat. Off. | G06F 9/44 |
| 0380211 | 8/1990 | European Pat. Off. | G06F 9/46 |

OTHER PUBLICATIONS

Proceedings Hypertext '89, 5 Nov. 1989, Pittsburgh, Pa., USA, pp. 137–146. Author: Amy Pearl, Entitled: 'Sun's Link Service: A Protocol for Open Linking'.

Hewlett-Packard Journal, vol. 40, No. 4, Aug. 1989, Palo Alto, Calif., USA, pp. 9–17. Author: Peter S. Showman, Entitled: 'An Object-Based User Interface for the HP NewWave Environment'.

Bigelow, James; *Hypertext and CASE;* IEEE Software; Mar. 1988.

*Primary Examiner*—Kevin A. Kriess
*Assistant Examiner*—J. Hall Backenstose
*Attorney, Agent, or Firm*—Blakely Sokoloff Taylor & Zafman

[57] ABSTRACT

A method and apparatus for extensible inter-application link management is disclosed. The apparatus is independent of the applications that manipulates the anchors linked by the links being managed. Anchors linked may reside on the same or different computers on a network. Links managed comprise navigation links and include links. Links managed may be further extended with application defined links. Application defined links may or may not require support by additional application provided link maker programs. Application defined links may inherit linking operations managed from the navigation link, include link and other existing application defined links with or without override.

20 Claims, 8 Drawing Sheets

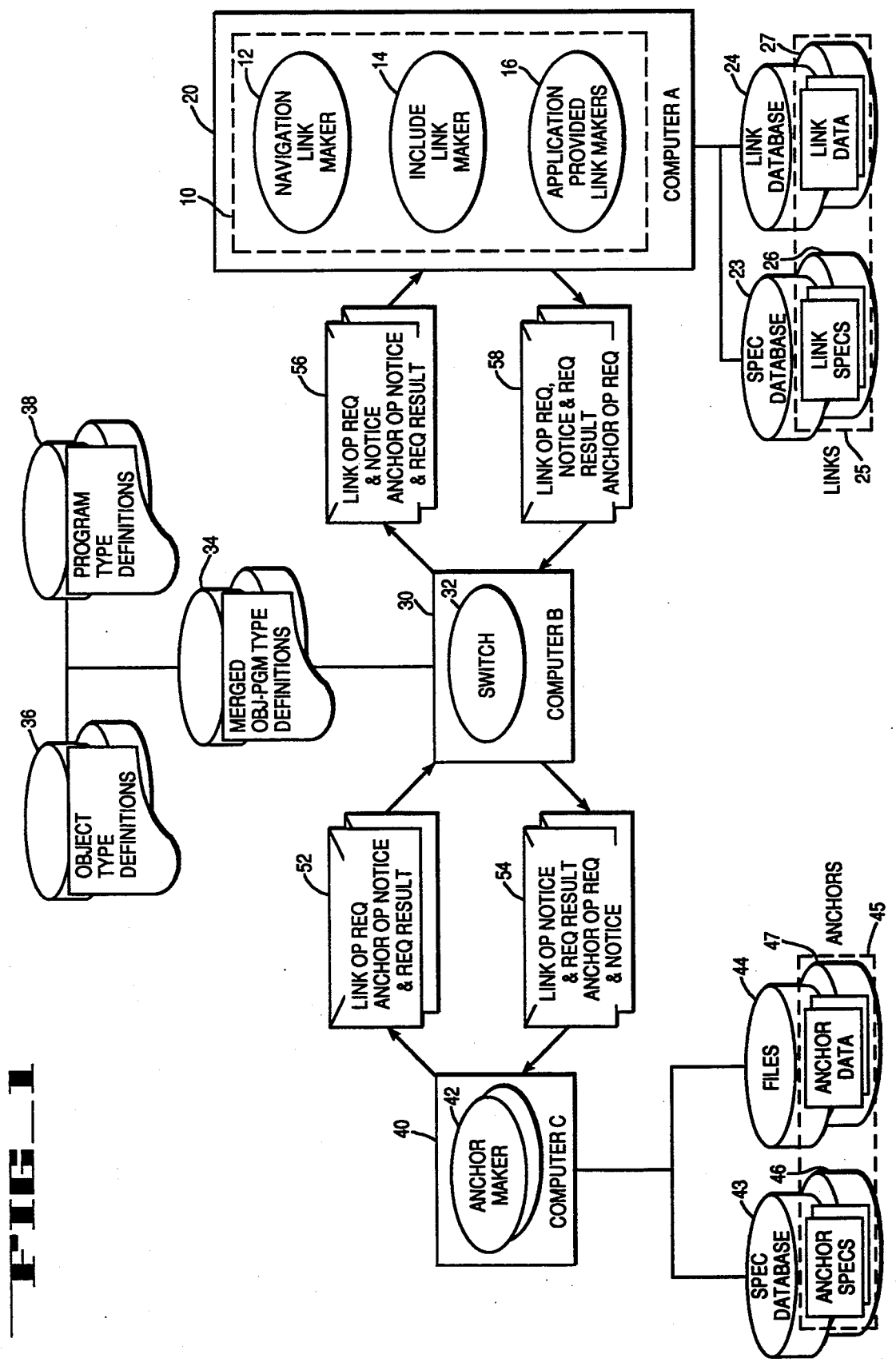
FIG_1

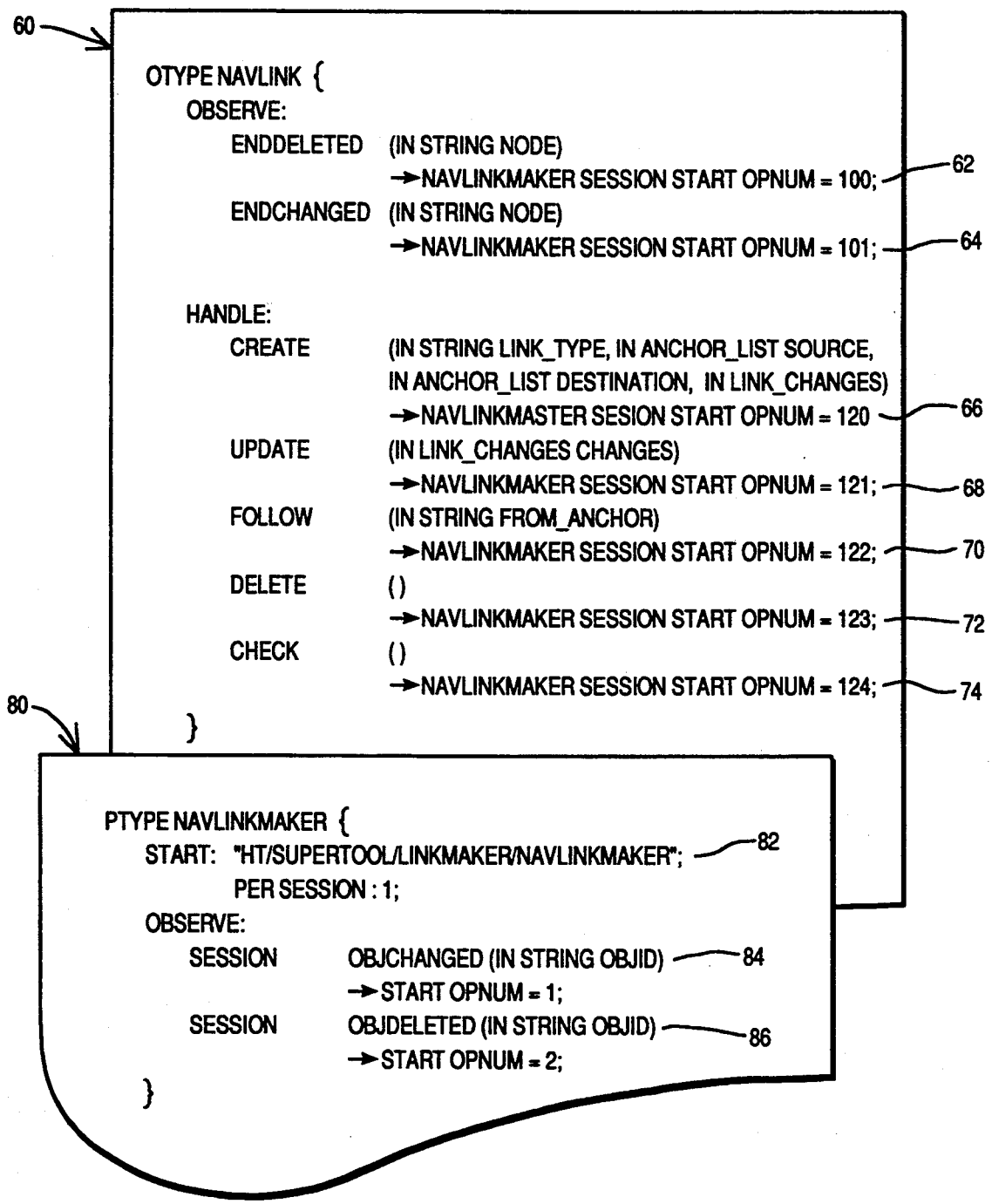
FIG_2A

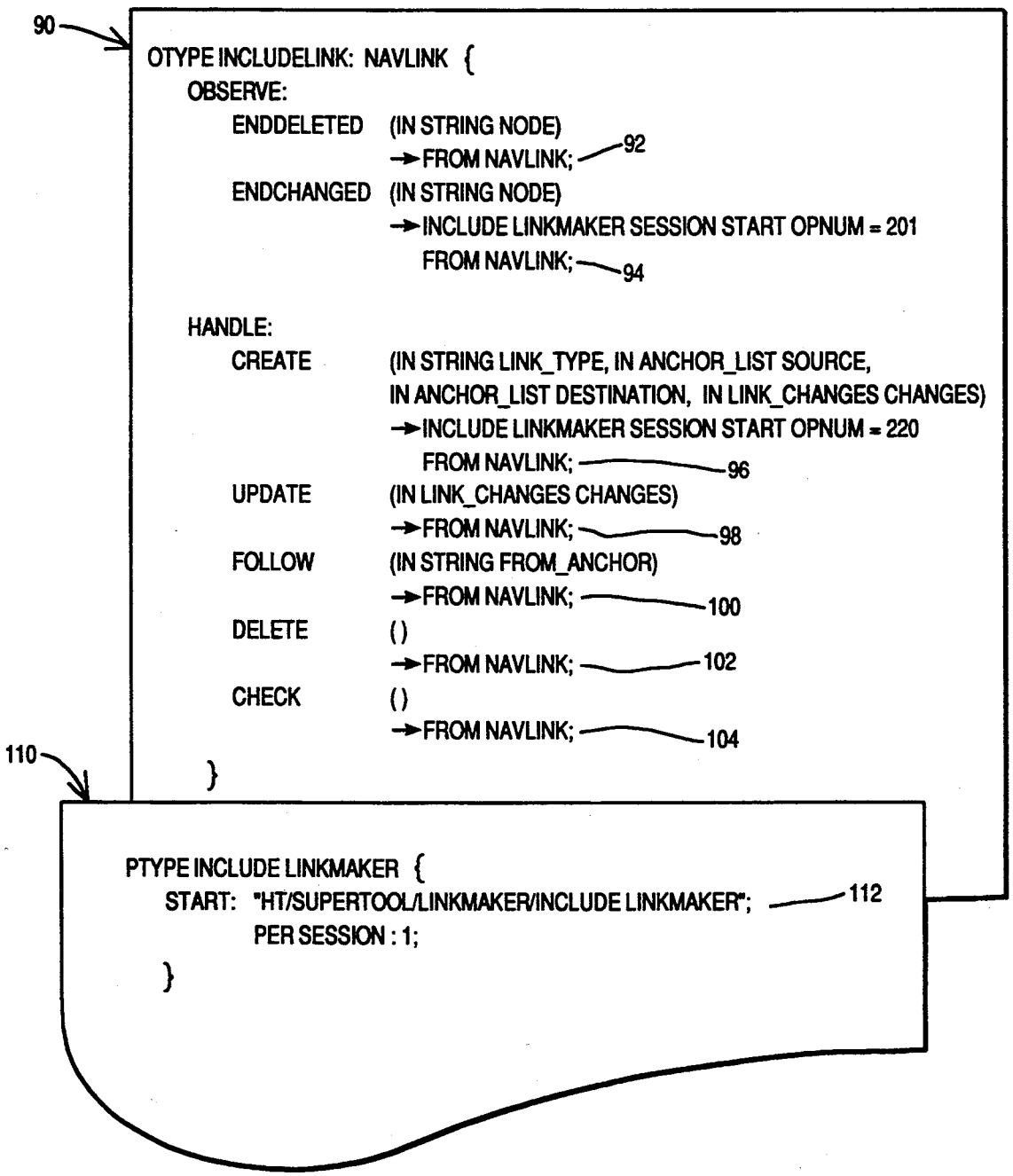
FIG_2B

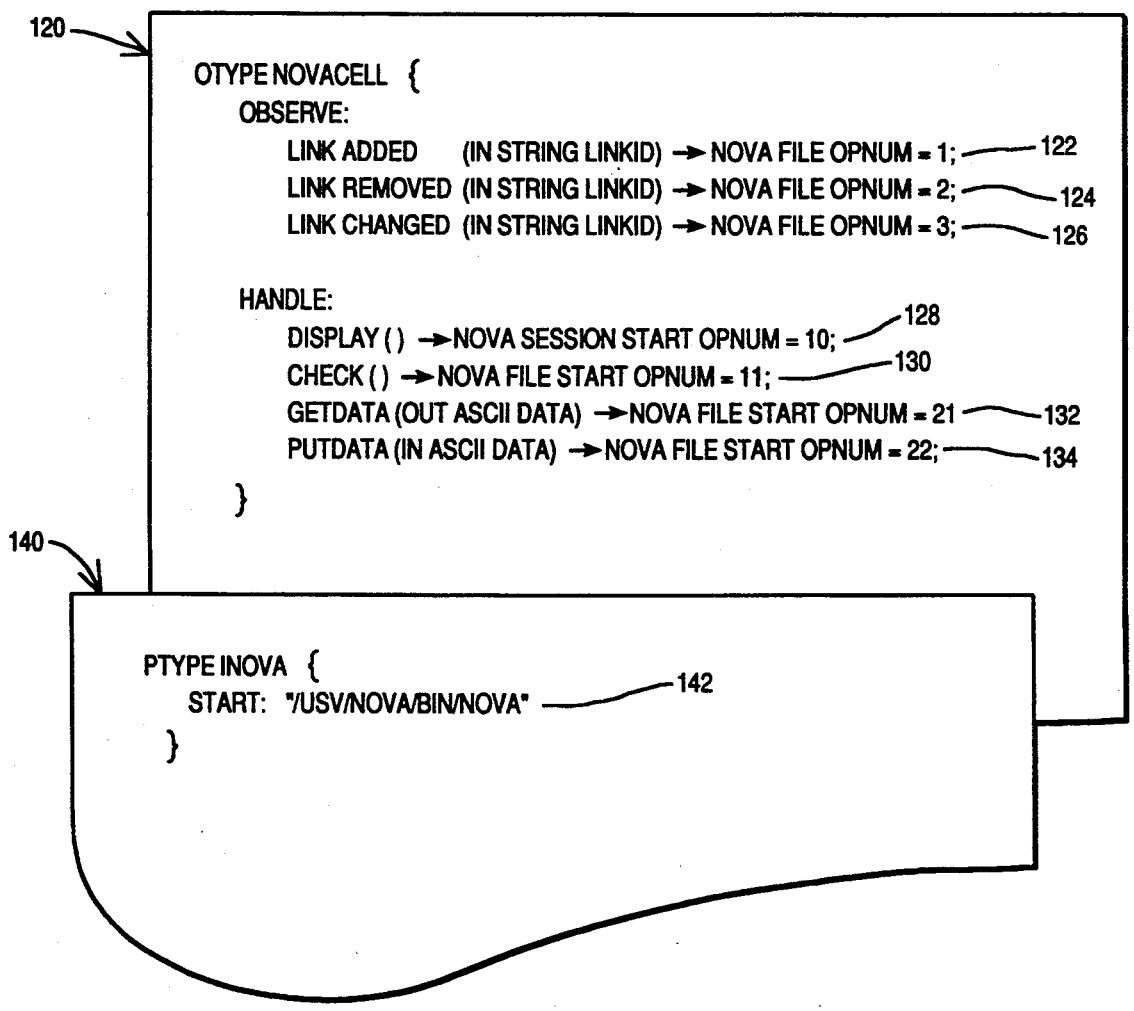
FIG_2C

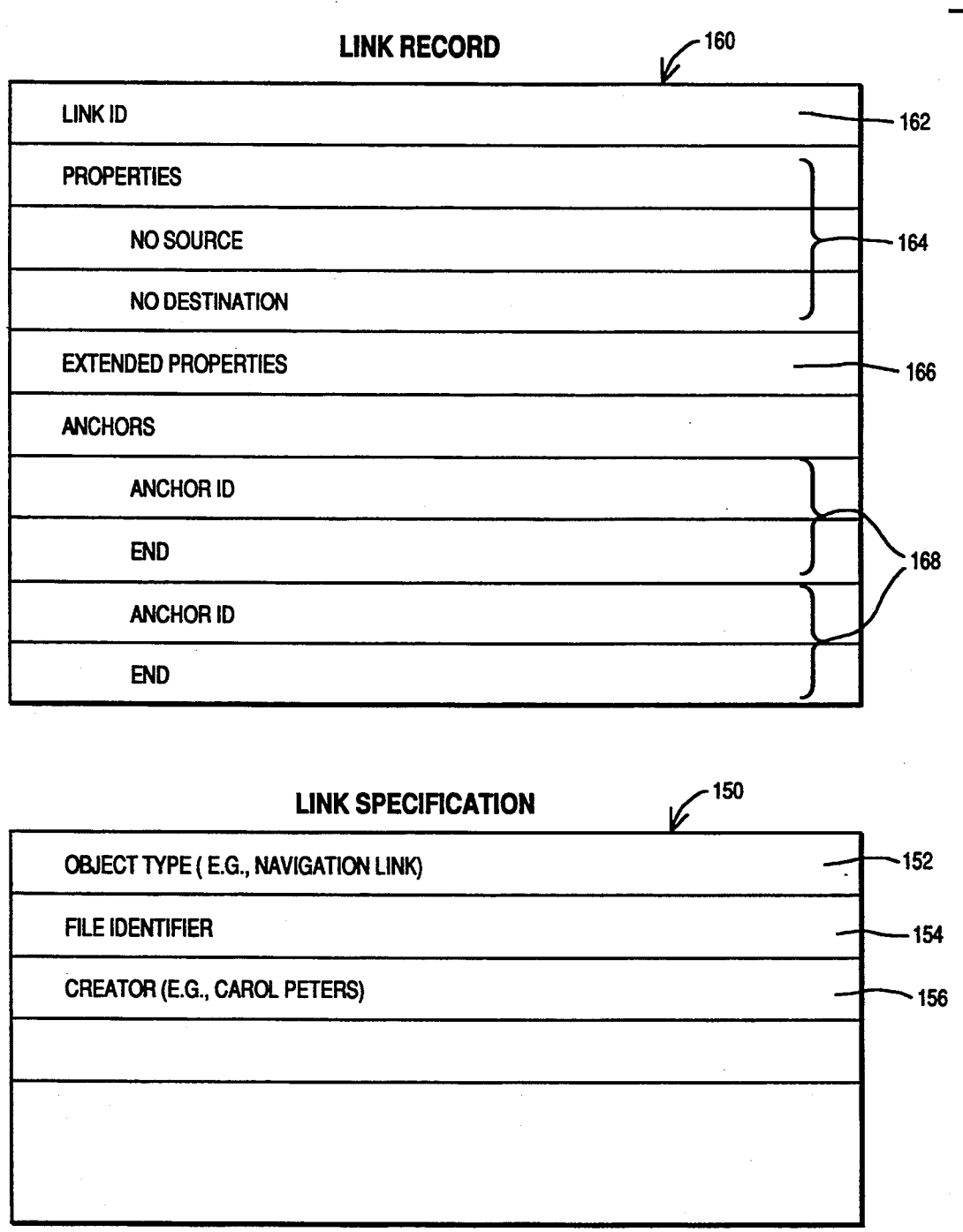
FIG_3

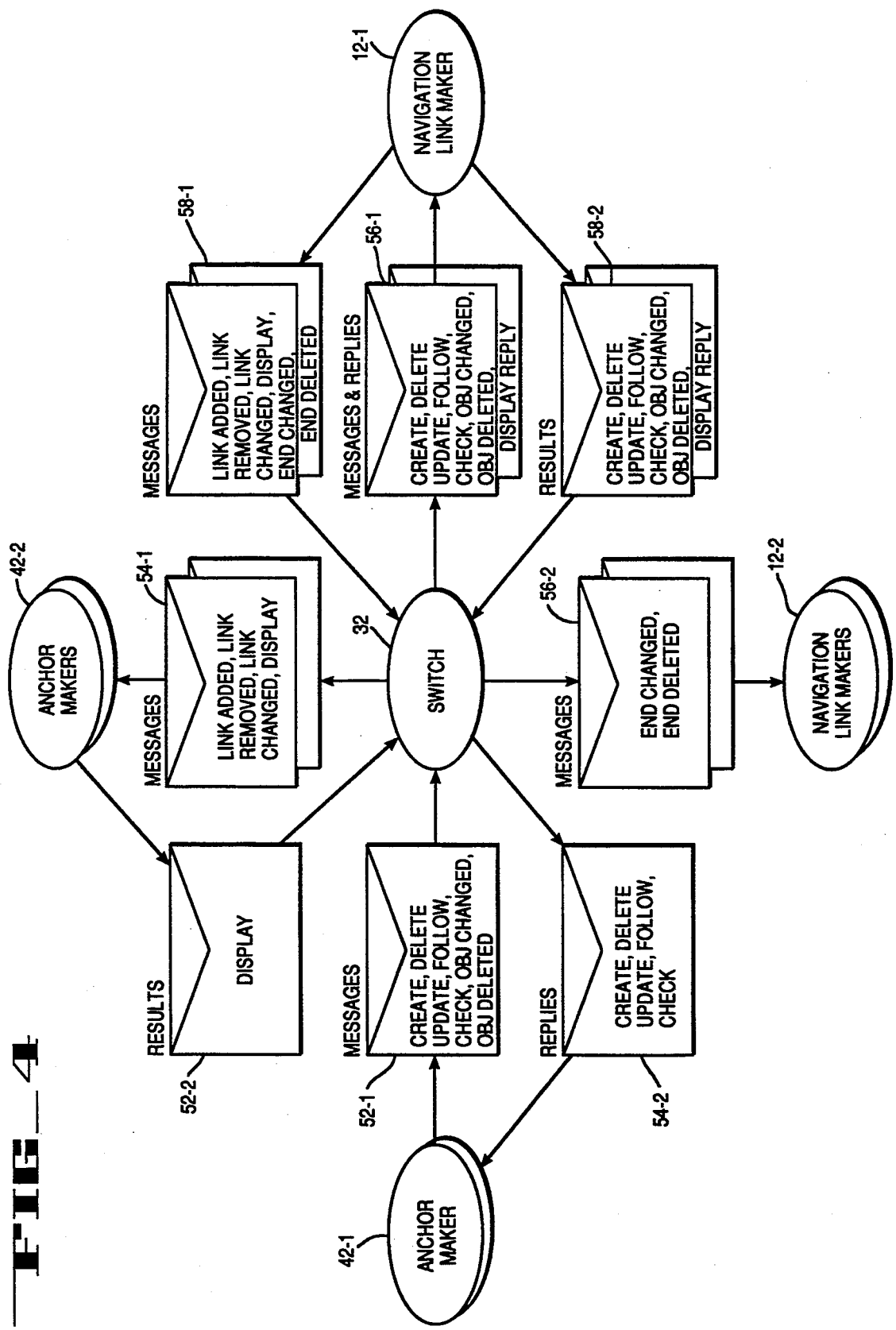
FIG_4

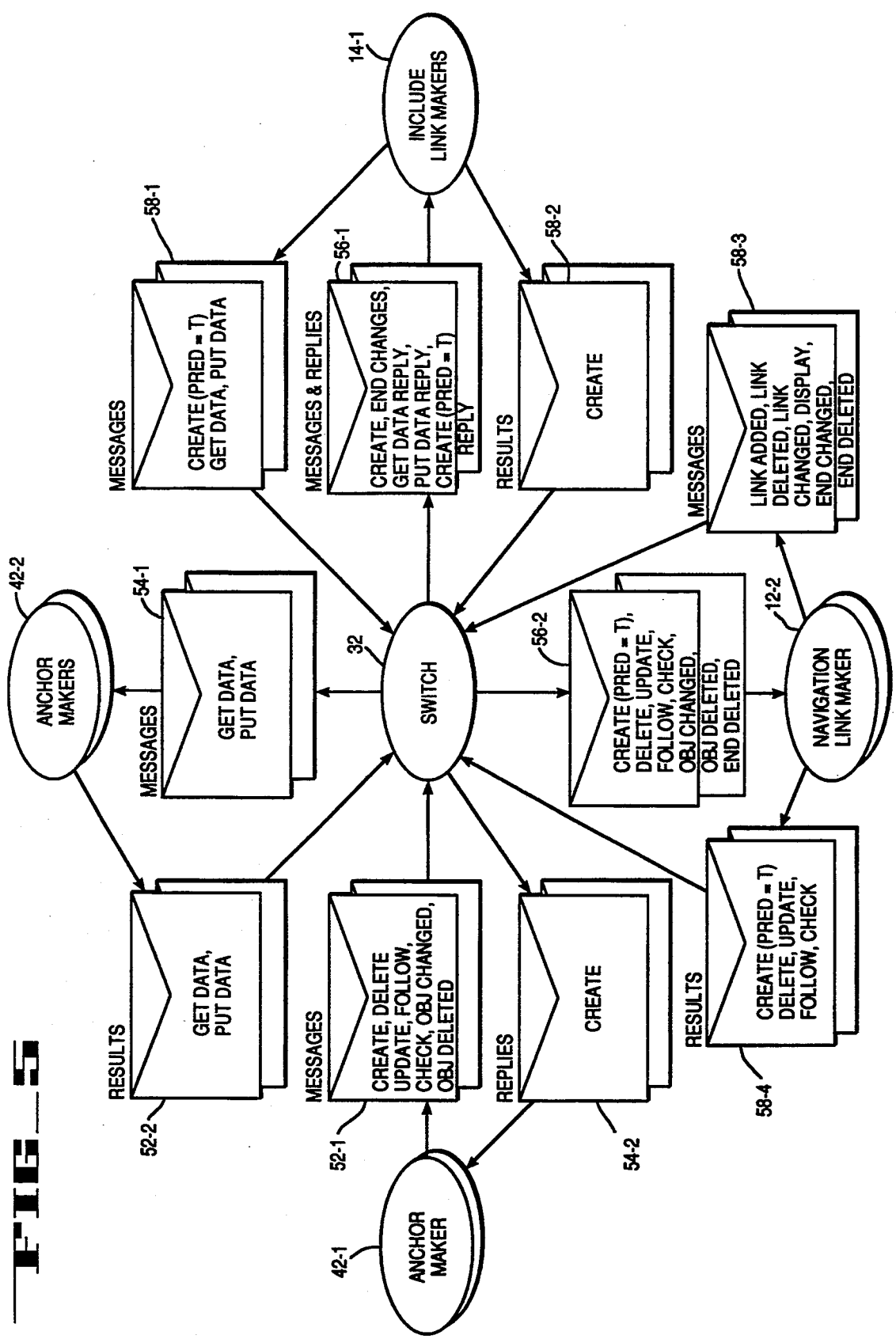
FIG._5

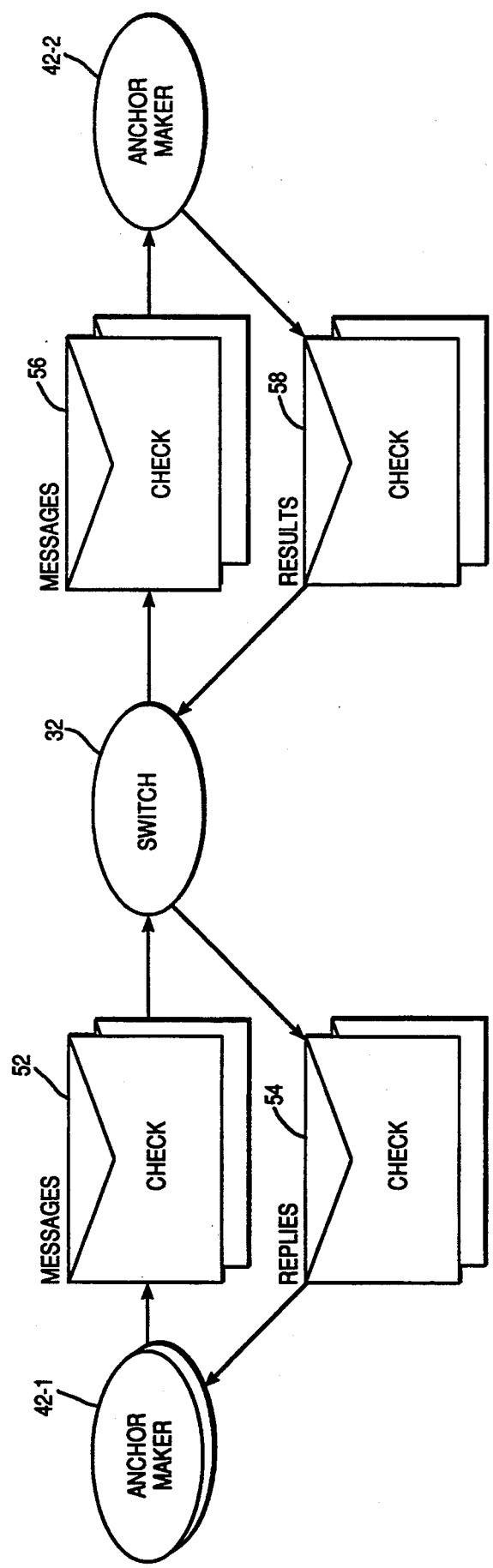
FIG_6

METHOD AND APPARATUS FOR EXTENSIBLE OBJECT-ORIENTED INTER-APPLICATION LINK MANAGEMENT

RELATED APPLICATIONS

This application is a continuation of application Ser. No. 07/657,159, filed Feb. 15, 1991, entitled "A METHOD AND APPARATUS FOR EXTENSIBLE INTER-APPLICATION LINK MANAGEMENT", now abandoned.

BACKGROUND OF THE INVENTION

1. Field of the Invention

The present invention relates to the field of computer systems. In particular, the present invention is a method and apparatus for extensible interapplication link management.

2. Art Background

A link represents a relationship between two or more anchors. An anchor at one of the ends of a link is typically an entity or a portion of a file. An entity of a file is application defined and managed. An application is a computer program that creates and manages files and the entities contained therein, including the linked entities, i.e. the anchors. A file and its entities may be managed by one or more applications. Different files managed by different applications may contain different kinds of entities. For example, an application may be a word processor application or a spreadsheet application. The word processor application manages document files containing sections and paragraphs, whereas the spreadsheet application manages spreadsheet files containing ranges of cells.

The relationship between linked anchors embodied in a link is specified by the link's type. Two link types are common, navigation links and include links.

1. Navigation Links. A navigation link, sometimes called a hypertext link, is a bridge between anchors. A user can "follow" a navigation link from one anchor to another, where "following" means displaying the anchor at the other end of the link. One application of navigation links is cross-referencing. For example, in an article, citation numbers in the text might be linked to bibliography entries. To examine an entry, a reader selects a citation number and directs the linking system to "follow" the link. The linking system displays the entry in the bibliography (the anchor at the other end of the link).

2. Include Links. An include link has the effect of automatically copying the contents of one anchor into another, when the first anchor is changed. For example, a drawing might be incorporated in several documents. Incorporating the documents by means of an include link simplifies updating the documents. Whenever the linked drawing is changed, it is automatically copied into the documents.

Existing linking systems have a number of shortcomings:

1. They provide only a single link type.

2. They are monolithic. There is no separation between an application that uses links and the linking system that implements links. Thus, for an application to use links, it must be tightly integrated with the linking system, which is typically difficult and impractical for proprietary applications.

3. They work on single computers. Anchors stored on different computers in a network cannot be linked.

4. The set of link types is fixed. Programmers who use the linking system cannot create new link types to represent new kinds of relationships between anchors.

These shortcomings have hindered the broad application of linking technology. As will be described, the present invention overcomes the disadvantages of the prior art, and provides a method and apparatus for extensible inter-application link management.

SUMMARY OF THE INVENTION

It is therefore an object of the present invention to provide an independent inter-application link manager uncoupled from the applications using the links being managed.

It is another object of the present invention that more than a single link type is supported, and the link types supported are extensible by the applications using the links being managed.

It is another object of the present invention that anchors may be linked regardless whether the anchors are stored on the same computer or different computers in a network.

These objects are realized by the method and apparatus of the present invention for extensible inter-application link management. The method comprises the steps of merging object type definitions defining link types, and program type definitions defining link maker programs executed by link maker processes of the apparatus for extensible inter-application link management of the present invention managing links having these link types, into merged object type-program type definitions; providing access to the merged object type-program type definitions to an interprocess message switch; sending linking operation requests, linking operation notices and anchor manipulating operation notices from anchor maker processes and link maker processes as request and notice messages to the switch, whereby causing the linking operation request, the linking operation notices and the anchor manipulating notices to be delivered to and managed by the link maker processes of the apparatus for extensible inter-application link management of the present invention.

The apparatus for extensible inter-application link management comprises at least one link maker means for managing linking operation requests, linking operation notices and anchor manipulating operation notices defined for at least one link type. Each of the link maker means comprises a link maker process executing a link maker program. Each of these link maker processes/programs comprises an interface for receiving the request and notice messages from the interprocess message switch. The link types and the link maker programs are defined by the object type definitions and the program type definitions.

Additionally, the method further comprises the steps of merging another set of object type definitions defining anchor types and another set of program type definitions defining anchor maker programs supporting the anchor types, into another set of of merged object type-program type definitions; providing this other set of merged object type-program type definitions to the same switch, whereby causing the linking operation notices and anchor manipulating operation notices to be delivered to and managed by the anchor maker processes. Furthermore, the method further comprises the step of sending anchor manipulating operation requests from anchor maker processes and link maker processes as request and notice messages to the same switch, whereby causing tile anchor manipulating operation requests to be delivered to and managed by the anchor maker processes.

The link types supported by the link maker programs comprise a navigation link type, an include link type and any number of application defined link types. The link maker programs supporting the link types comprise a navigation link maker program, an include link maker program and any number of application provided link maker programs.

Linking operation requests and notices managed for the navigation link type comprise a request of "Create", a request of "Delete", a request of "Update", a request of "Follow", a request of "Check", a notice of "End-Changed" and a notice of "EndDeleted". These linking operation requests and notices are managed for the navigation link type by the navigation link maker program. Additionally, the navigation link maker program manages a number of link type independent anchor manipulating operation notices. The link type independent anchor manipulating operation notices comprise a notice of "ObjChanged", and a notice of "ObjDeleted".

Linking operation requests, linking operation notices and anchor manipulating operation notices managed for the include link type comprises the same requests and notices managed for the navigation link types. These requests and notices for the include link type are also managed by the navigation link maker program except the request of "Create" which is "preprocessed" and "post-processed" by the include link making program, and the notice of "EndChanged" which is managed by the include link maker program.

Each new application defined link type may inherit linking operation requests and notices, managed for the existing navigation, include and application defined link types, by the existing navigation, include and application provided link maker programs. Each of the inherited linking operation requests and notices may be overridden to facilitate "pre-processing" and "post-processing" by the new application provided link maker program.

Linking operation notices managed for various anchor types comprise a notice of "LinkAdded", a notice of "LinkDeleted", and a notice of "LinkChanged". Anchor manipulating operation requests and anchor manipulating operation notices managed for various anchor types comprise a request of "Check", a request of "GetData" and a request of "PutData". These linking operation notices, anchor manipulating operation request and anchor manipulating operation notices are managed by the anchor maker programs with or without "pre-processing" and "post-processing" by other anchor maker programs.

BRIEF DESCRIPTION OF THE DRAWINGS

FIG. 1 is a block diagram illustrating the method and apparatus of the present invention for extensible inter-application link management.

FIGS. 2a, 2b, & 2c are block diagrams illustrating the navigation link type definition, the navigation link maker program definition, the include link type definition, the include link maker program definition, an exemplary anchor type definition and an exemplary anchor maker program definition.

FIG. 3 is a block diagram illustrating the link specification and link record format used by the apparatus for extensible inter-application link management of the present invention.

FIG. 4 is a block diagram illustrating routing of linking operation requests, linking operation notices, and anchor manipulating notices managed for the navigation link type.

FIG. 5 is a block diagram illustrating routing of linking operation requests, linking operation notices, and anchor manipulating notices managed for the include link type.

FIG. 6 is a block diagram illustrating routing of linking operation notices, anchor manipulating requests and anchor manipulating notices managed for an exemplary anchor type.

NOTATIONS AND NOMENCLATURE

The detailed description which follows is presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind that the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The algorithms presented herein are not entirely related to any particular computer or other apparatus. In particular, various general purpose machines may be used with programs written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for extensible inter-application link management, having particular application to multiprocess applications executing on different computers on a network, is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

1. OVERVIEW:

Referring now to FIG. 1, a block diagram illustrating the preferred embodiment of the apparatus of the present invention for extensible inter-application link management is shown. The apparatus for extensible inter-application link management 10 is shown managing a plurality of links 25 linking a plurality of anchors 45 managed and manipulated by at least one anchor maker process 42.

The links 25 and anchors 45 are managed and manipulated as objects comprising a specification (spec) portion 26, 46 and a data portion 27, 47. The links 25 and anchors 45 being objects, have object types that define object operations for objects of the particular object types. The link types defining linking operations for the links 25 managed, the anchor types defining the anchor manipulating operations for the anchors 45 linked and manipulated, and the programs supporting these linking and anchor manipulating operations are defined through a plurality of definitions 34–38.

Linking operations and anchor manipulating operations comprise linking operation requests and notices, and anchor manipulating requests and notices. The apparatus 10 manages linking operation requests, linking operation notices and anchor manipulating notices. The anchor processes 42 manage linking operation notices, anchor manipulating requests and anchor manipulating notices. The linking and anchor manipulation operation requests and notices are selectively routed as request and notice messages 52–58 to components of the apparatus 10 and the anchor maker processes 42 using at least one interprocess message switch 32 having access to the definitions 52–58. The components of the apparatus 10, the anchor maker processes 42 and the switches 32 are executing on any number of computers 20, 30, 40 connected to a network (not shown).

The linking and anchor manipulating operation request and notice messages 52–58 are selectively routed by the switches 32 based on the content of the messages 52–58 and the definitions 34–38. A linking/anchor manipulating operation request/notice message 52–58 is delivered to at most one link maker or anchor maker process 12–16, 42 to handle. Each linking/anchor manipulating operation request message 52–58 also entails a reply to the sending link/anchor maker process 12–16, 42 from the receiving switch 32 based on the selection or handling results.

A linking/anchor manipulating operation request/notice message 52–58 may be addressed to an object, i.e. a link 25 or an anchor 45. An object oriented linking-/anchor manipulating operation request/notice message 52–58 comprising an non-overridden inherited object operation is delivered to the predecessor link/anchor maker process 12–16, 42. An object oriented linking/anchor manipulating operation request/notice message 52–58 comprising an overridden inherited object operation is also delivered to the predecessor link/anchor maker process 12–16, 42, if the predecessor attribute is set, otherwise to the overriding inheritor link/anchor maker process 12–16, 42.

A linking/anchor manipulating operation request/notice message 52–58 may be scoped to a particular user session or a non-session message scope e.g. a file 44. Only local link/anchor maker processes 12–16, 42 are eligible to be selected for a request/notice message 52–58 scoped to a user session. Remote link/anchor maker processes 12–16, 42 are also eligible to be selected for a request and notice message 52–58 scoped to a non-session message scope.

For further information on interprocess message switching, including object oriented interprocess message switching and scoped interprocess message switching, see the Specifications in co-pending U.S. patent applications Ser. No. 07/627,735, 07/646,357, and 07/644,942, filed on Dec. 14, 1990, Jan. 25, 1991 and Jan. 23, 1991, assigned to the assignee of the present Application, Sun Microsystems Inc., entitled *A Method and Apparatus for Interprocess Message Switching, A Method and Apparatus for Object Oriented Interprocess Message Switching,* and *A Method and Apparatus for Scoped Interprocess Message Switching.*

The apparatus for extensible inter-application link management of the present invention 10 comprises at least one link maker process 12–16 managing linking operation requests, linking operation notices and anchor manipulating notices for at least one link type. The preferred embodiment of the apparatus 10 comprises a navigation link maker process 12, an include link maker processes 14 and any number of application provided link maker processes 16, managing linking operation requests, linking operation notices and anchor manipulating notices for a navigation link type, an include link type and any number of application defined link types. Each of the link maker processes 12–16 comprises an interface (not shown) for receiving the request and notice messages 56 as input. Upon receipt of the request and notice messages 56, the link maker processes 12–16 manage the requests and notices accordingly.

2. NAVIGATION LINK TYPE AND NAVIGATION LINK MAKER PROCESS

Referring now to FIG. 2a, a block diagram illustrating the object type definition for the navigation link type 60 and the program type definition for the navigation link maker program 80 executed by the navigation link maker process is shown. The navigation link type definition 60 defines the linking operation requests and notices 62–74 handled and observed for the navigation link type. The navigation link type definition 60 further defines the link making handler and observer programs for the linking operation requests and notices 62–74 being defined. The navigation link maker program definition 80 defines the start up instructions 82 and the object type independent message signatures 84–86 handled and observed by the navigation link maker program.

The linking operations observed for the navigation link type comprise a linking operation notice of "EndDeleted" 62 and a linking operation notice of "EndChanged" 64. These linking operation notices are to be observed by the navigation link maker program. The linking operations handled for the navigation link type comprise a linking operation request of "Create" 66, a linking operation request of "Update" 68, a linking operation request of "Follow" 70, a linking operation request of "Delete" 72 and a linking operation request of "Check" 74. These linking operation requests are to be handled by the navigation link maker program.

The start up instructions 82 for the navigation link maker program comprises the start up parameters "/tt/.../avlinkmaker" and the instance limit of "per session:1", instructing that only one instance of the navigation link maker program is to be started per user session. The object type independent message signatures 84-86 comprise an anchor manipulating operation notice of "ObjChanged" 84 observed and an anchor manipulating operation notice of "ObjDeleted" 86 observed.

The object type definition for navigation link type 60 and the program type definition for navigation link maker program 80 are merged, and the merged object type-program type definition is made accessible to the switches (see FIG. 1). For further information on object type definition, program type definition and merged object type-program type definition, see the referenced Specifications.

a. Create

The linking operation request "Create" 66 for the navigation link type is for an anchor process to request a navigation link to be created. A navigation link "Create" linking operation request is sent by an anchor maker process as an object oriented request message scoped to a user session. A navigation link "Create" linking operation request message comprises a message identifier attribute, a message scope type attribute comprising the message scope type of "Session", a message sender session attribute comprising the session identifier of the sending anchor process, a message class attribute comprising the message class of "Request", a message object type attribute comprising the object type "NavLink", a message operation attribute comprising the object operation code of "Create", and a set of message argument attribute comprising the object operation arguments of the link type identifier, i.e. "NavLink", a list of source anchor identifiers, a list of destination anchor identifiers, and a list of link properties. Source anchors, destination anchors and link properties will be discussed in further details later in conjunction with link records. For further information on message attributes, also see the referenced Specifications.

Upon receipt of a navigation link "Create" linking operation request, the navigation link maker process creates a link specification and a link record (see FIG. 1) using the message operation arguments received. Additionally, the navigation link maker process addresses a "LinkAdded" linking operation notice message to each of the anchors listed in the "Create" linking operation request and sends these messages to the local switch for delivery to anchor maker processes. Furthermore, the navigation link maker process sends the handling results for the navigation link "Create" linking operation request to the local switch for delivery as reply to the sending anchor maker process. The link specification, the link record, the "LinkAdded" linking operation notice message will be discussed in further details later.

b. Update

Continuing referring to FIG. 2a, the linking operation request "Update" 68 for the navigation link type is for an anchor process to request a navigation link to be updated. A navigation link "Update" linking operation request is sent by an anchor maker process as an object oriented request message scoped to a user session. A navigation link "Update" linking operation request message comprises a message identifier attribute, a message scope type attribute comprising the message scope type of "Session", a message sender session attribute comprising the session identifier of the sending anchor process, a message class attribute comprising the message class of "Request", a message object identifier attribute comprising the link identifier for the link to be updated, a message operation attribute comprising the object operation code of "Update", and a message operation argument attribute comprising a list of changes to be made. Changes comprise changes to source anchors, changes to destination anchors and changes to link properties.

Upon receipt of a navigation link "Update" linking operation request, the navigation link maker process updates the link specification and the link record for the link identified. Additionally, the navigation link maker process addresses a "LinkChanged" linking operation notice message to each of the link's anchors and sends these messages to the switch for delivery to anchor maker processes. Furthermore, the navigation link maker process sends the handling results for the navigation "Update" linking operation request to the local switch for delivery as reply to the anchor sending process. The "LinkChanged" linking operation notice message will also be discussed in further details later.

c. Follow

Continuing referring to FIG. 2a, the linking operation request "Follow" 70 for the navigation link type is for an anchor process to request a navigation link be followed, and the destination anchor at the end of the navigation link be displayed. A navigation link "Follow" linking operation request is sent by an anchor maker process as an object oriented request message scoped to a user session. A navigation "Follow" linking operation request message comprises a message identifier attribute, a message scope type attribute comprising the message scope type of "Session", a message sender session attribute comprising the session identifier of the sending anchor process, a message class attribute comprising the message class of "Request", a message object identifier attribute comprising the link identifier for the link to be followed, a message operation attribute comprising the object operation code of "Follow", and a message operation argument attribute comprising a source anchor identifier.

Upon receipt of a navigation link "Follow" linking operation request, the navigation link maker process retrieves the destination anchor identifiers from the link record based on the source anchor identifier received, and the file identifiers for the destination anchors from the anchor specifications. Additionally, the navigation link maker process addresses a "Display" anchor manipulating request message to each anchor at the other end of the link and sends these messages to the local switch for delivery to handling anchor processes. Furthermore, upon receipt of reply to the last outstanding "Display" anchor manipulating request message, the navigation link maker process sends the handling results for the navigation link "Follow" linking operation request to the local switch for delivery as reply to the sending anchor maker process. The "Display" anchor manipulating operation request message will also be discussed in further details later.

d. Delete:

Continuing referring to FIG. 2a, the linking operation request "Delete" 72 for navigation link type is for an anchor process to request a navigation link be deleted. A navigation link "Delete" linking operation request is sent by an anchor maker process as an object oriented request message scoped to a user session. A navigation link "Delete" linking operation request message comprises a message identifier attribute, a message scope type attribute comprising the message scope type of "Session", a message sender session attribute comprising the session identifier of the sending anchor process, a message class attribute comprising the message class of "Request", a message object identifier attribute comprising the link identifier for the link to be deleted, and a message operation attribute comprising the object operation code of "Delete".

Upon receipt of a navigation link "Delete" linking operation request, the navigation link maker process deletes the link specification and the link record for the link identified. Additionally, the navigation link maker process addresses a "LinkRemoved" linking operation notice message to each anchor previously linked and sends these messages to the local switch for delivery to anchor maker processes. Furthermore, the navigation link maker process sends the handling results for the navigation link "Delete" linking operation request to the local switch for delivery as a reply to the sending anchor maker process. The "LinkRemoved" operation notice message will also be discussed in further details later.

e. Check:

Continuing referring to FIG. 2a, the linking operation request "Check" 74 for navigation link type is for an anchor process to request a navigation link be checked. A navigation link "Check" linking operation request is sent by an anchor maker process as an object oriented request message scoped to a user session. A navigation link "Check" linking operation request message comprises a message identifier attribute, a message scope type attribute comprising the message scope type of "Session", a message sender session attribute comprising the session identifier of the sending anchor process, a message class attribute comprising the message class of "Request", a message object identifier attribute comprising the link identifier for the link to be checked, and a message operation attribute comprising the object operation code of "Check".

Upon receipt of a navigation link "Check" linking operation request, the navigation link maker process verifies the link specification and the link record for the link identified. Additionally, the navigation link maker process sends handling results for the navigation link "Check" linking operation request to the local switch for delivery as reply to the sending anchor maker process.

f. ObjChanged

Continuing referring to FIG. 2a, the anchor manipulating notice "ObjChanged" 84 is for an anchor process to notify link maker processes that an anchor has been changed. An "ObjChanged" anchor manipulating operation notice is sent by an anchor maker process as an object type independent notice message scoped to a user session. An "ObjChanged" linking operation notice message comprises a message identifier attribute, a message scope type attribute comprising the message scope type of "Session", a message sender session attribute comprising the session identifier of the sending anchor process, a message class attribute comprising the message class of "Notice", a message operation attribute comprising the object operation code of "ObjChanged" and a message argument attribute comprising an anchor identifier.

Upon receipt of an object type independent "ObjChanged" anchor manipulating operation notice, the navigation link maker process accesses the link records and verifies that the anchor changed is indeed a linked anchor. Additionally, if the anchor changed is a linked anchor, the navigation link maker process sends an "EndChanged" linking operation notice message to the local switch for delivery to link maker processes, for each of the links linking the changed anchor, regardless of link types. The "End Changed" linking operation notice message will be discussed in further details later.

g. ObjDeleted

Continuing referring to FIG. 2a, the anchor manipulating notice "ObjDeleted" 86 is for an anchor process to notify link maker processes that an object has been deleted. A "ObjDeleted" anchor manipulating operation notice is sent by an anchor maker process as an object type independent notice message scoped to a user session. A "ObjDeleted" linking operation notice message comprises a message identifier attribute, a message scope type attribute comprising the message scope type of "Session", a message sender session attribute comprising the session identifier of the sending anchor process, a message class attribute comprising the message class of "Notice", a message operation attribute comprising the object operation code of "ObjDeleted" and a message argument attribute comprising an anchor identifier.

Upon receipt of an object type independent "ObjDeleted" anchor manipulating operation notice, the navigation link maker process accesses the link records and verifies that the object deleted is a linked anchor. Additionally, if the object deleted is a linked anchor, the navigation link maker process sends an "EndDeleted" linking operation notice message to the local switch for delivery to link maker processes, for each of the links linking the deleted anchor, regardless of link types. The "End Deleted" linking operation notice message will also be discussed in further details later.

h. EndChanged

Continuing referring to FIG. 2a, the linking operation notice "EndChanged" 62 for the navigation link type is for the navigation link maker process to notify itself, that an anchor linked by a navigation link has been changed. A navigation link "EndChanged" linking operation notice is sent by the navigation link maker process as an object oriented notice message scoped to a user session. A navigation link "EndChanged" linking operation notice message comprises a message identifier attribute, a message scope type attribute comprising the message scope type of "Session", a message sender session attribute comprising the session identifier of the sending navigation link maker process, a message class attribute comprising the message class of "Notice", a message object attribute comprising a link identifier for the link whose end has changed, a message operation attribute comprising the object operation code of "End-Changed" and a message argument attribute comprising an anchor identifier for the changed anchor.

Upon receipt of a navigation link "EndChanged" linking operation notice, the navigation link maker process takes no action. It will be appreciated that having the navigation link maker process include itself as one of the addresses of the "EndChanged" linking operation notices, even though the navigation link maker process is aware of the end changes and takes no action upon receipt of an "EndChanged" notice, the method and apparatus of the present invention provides a simpler and more consistent approach to transforming an "ObjChanged" anchor manipulating operation notice message to the "EndChanged" linking operation notice messages.

i. EndDeleted:

Continuing referring to FIG. 2a, the linking operation notice "EndDeleted" 64 for the navigation link type is for the navigation link maker process to notify itself that an anchor linked by a navigation link has been deleted. A navigation link "EndDeleted" linking operation notice is sent by the navigation link maker process as an object oriented notice message scoped to a user session. A navigation link "EndDeleted" linking operation notice message comprises a message identifier attribute, a message scope type attribute comprising the message scope type of "Session", a message sender session attribute comprising the session identifier of the sending navigation link maker process, a message class attribute comprising the message class of "Notice", a message object attribute comprising a link identifier for the link whose end has been deleted, a message operation attribute comprising the object operation code of "EndDeleted" and a message argument attribute comprising an anchor identifier for the deleted anchor.

Upon receipt of the navigation link "EndDeleted" linking operation notice, the navigation link maker process deletes the anchor identified from the link records and updates the link properties in the link records.

3. INCLUDE LINK TYPE AND INCLUDE LINK MAKER PROCESS

Referring now to FIG. 2b, a block diagram illustrating the object type definition 90 for the include link type and the program type definition 110 for the include link maker program executed by the include link maker process is shown. The include link type definition 90 defines the linking operation requests and notices 92-104 handled and observed for the include link type. The include link type definition 90 further defines the link maker handler and observer programs for the linking operation requests and notices 92-104 being defined. The include link maker program definition 110 defines the start up instructions 112 and the object type independent message signatures 84-86 handled and observed by the include link maker program.

The linking operations observed 92-94 for the include link type comprise a linking operation notice of "EndDeleted" 92 and a linking operation notice of "EndChanged" 94. These linking operation notices are to be inherited from the navigation link type, thus they are to be observed by the navigation link maker program. However, the linking operation notice of "EndChanged" 94 is to be inherited with override, thus it is to be observed by the include link maker program before it is observed by the navigation link maker program.

The linking operations handled 96-104 comprise a linking operation request of "Create" 96, a linking operation request of "Update" 98, a linking operation request of "Follow" 100, a linking operation request of "Delete" 102 and a linking operation request of "Check" 104. These linking operation requests are to be inherited from the navigation link type, thus they are to be handled by the navigation link maker program. However, the linking operation notice of "Create" 96 is to be inherited with override, thus it is to be handled by the include link maker program before it is handled by the navigation link maker program.

The start up instructions 112 for the include link maker program comprise the start up parameters "/tt/.../includelinkmaker" and the instance limit of "per session:1", instructing that only one instance of the navigation link maker program is to be started per user session.

The object type definition for the include link type 90, the program type definition for the include link maker program 110 and the program type definition for the navigation link maker program (see FIG. 2a) are merged into merged object type-program type definitions and made accessible to the switches (see FIG. 1).

a. Create

Continuing referring to FIG. 2b, the linking operation request "Create" 96 for the include link type is for an anchor process to request an include link to be created. An include link "Create" linking operation request is sent by an anchor maker process as an object oriented request message scoped to a user session. An include link "Create" linking operation request message comprises the same message attributes having the same values, as a navigation link "Create" linking operation request message, except the message object type attribute which comprises the object type of "IncludeLink".

Upon receipt of the include link "Create" linking operation request, the include link maker process verifies that only one source anchor identifier is specified, and the source anchor and the destination anchors have compatible data exchange formats. Upon successful completion of verification, the include link maker process sends a "new" include link "Create" linking operation request with the predecessor attribute set to "True", thereby causing the include link "Create" linking operation request to be delivered to the navigation link maker process to handle. Upon receipt of the reply to the "new" include link "Create" linking operation request, the include link maker process addresses a "GetData" anchor manipulating operation request message to the new link's source anchor and sends the message to the switch for delivery to an anchor maker process. Upon receipt of the reply to the "GetData" anchor manipulating operation request, the include link maker process copies the data into a "PutData" anchor manipulating operation request message. The include link maker process further addresses a copy of the "PutData" message to each of the new link's destination anchors and sends these messages to the switch for delivery to anchor maker processes. Upon receipt of the last reply to these "PutData" messages, the include link maker process sends handling results to the local switch for reply to the original sending anchor maker process, for the original include link "Create" linking operation request.

Upon receipt of an include link "Create" linking operation request, the navigation link maker process handles the linking operation request in the same manner as previously described for a navigation link "Create" linking operation request. The "GetData" and "PutData" anchor manipulating operation request messages will be discussed in further detail later.

b. Update, Follow, Delete, Check

Continuing referring to FIG. 2b, the linking operation requests "Update" 98, "Follow" 100, "Delete" 102 and "Check" 104 for the include link type are for an anchor process to request an include link be deleted, updated, followed, and checked. An include link "Update", "Follow", "Delete" or "Check" linking operation request, is sent by an anchor maker process as an object oriented request message scoped to a user session. An include link "Update", "Follow", "Delete" or "Check" linking operation request message comprises the same message attributes having the same values, as the corresponding navigation link "Update", "Follow", "Delete" or "Check" linking operation request message 98–104, except the message object identifier attribute resolves to the object type "IncludeLink".

Since the include link type inherits the "Update", "Follow", "Delete" and "Check" linking operations from the navigation link type, the include link "Update", "Follow", "Delete" and "Check" linking operation requests are delivered to the navigation link maker process to handle. Upon receipt of an include link "Update", "Follow", "Delete" or "Check" linking operation request, the navigation link maker process handles the linking operation request in the same manner as previously described for the corresponding navigation link "Update", "Follow", "Delete" or "Check" linking operation request.

c. EndChanged

Continuing referring to FIG. 2b, the linking operation notice "EndChanged" 92 for the include link type is for the navigation link maker process to notify the include link maker process that a link end, i.e. a source or destination anchor, has been changed. An include link "EndChanged" linking operation notice is sent by the navigation link maker process as an object oriented notice message scoped to a user session. An include link "EndChanged" linking operation notice message comprises the same message attributes having the same values, as the corresponding navigation link "EndChanged" linking operation notice message, except the message object identifier attribute resolves to the object type "IncludeLink".

Since the include link type inherits the "EndChanged" linking operation from the navigation link type with override, the include link "EndChanged" linking operation requests are delivered to the include link maker process to handle first. Upon receipt of an include link "EndChanged" linking operation notice, the include link maker process sends a "GetData" anchor manipulating operation request to the local switch for delivery to an anchor maker process, if the changed anchor is a source anchor. Upon receipt of reply to the "GetData" anchor manipulating operation request, the include link maker process sends a "PutData" anchor manipulating operation request to the local switch for delivery to anchor maker processes, for each of the link's destination anchors.

Additionally, the include link maker process sends a "new" include link "EndChanged" linking operation notice with predecessor attribute set to "True", thereby causing the include link "EndChanged" linking operation notice to be delivered to the navigation link maker process to handle. Similar to the navigation link "EndChanged" linking operation notice, upon receipt of the include link "EndChanged" linking operation notice, the navigation link maker process takes no action. It will also be appreciated having the include link maker send a "new" include link "EndChanged" linking operation notice, even though the navigation link maker process takes no action, the method and apparatus of the present invention provides a more consistent approach to inheriting linking operations with override.

d. EndDeleted

Continuing referring to FIG. 2b, the linking operation notice of "EndDeleted" 94 for the include link type is for the navigation link maker process to notify the include link maker process of an end, i.e. a source anchor or a destination anchor, has been deleted. An include link "EndDeleted" linking operation notice, is sent by an anchor maker process as an object oriented request message scoped to a user session. An include link "EndDeleted" linking operation notice message comprises the same message attributes having the same values, as the corresponding navigation link "EndDeleted" linking operation notice message, except the message object identifier attribute revolves to the object type "IncludeLink".

Since the include link type inherits the "EndDeleted" linking operation from the navigation link type, the include link "EndDeleted" linking operation requests are delivered to the navigation link maker process to handle. Upon receipt of an include link "EndDeleted" linking operation notice, the navigation link maker process handles the linking operation notice in the same manner as previously described for the corresponding navigation link "EndDeleted" linking operation notice.

4. APPLICATION DEFINED LINK TYPES AND APPLICATION PROVIDED LINK MAKER PROCESS

Referring back to FIG. 1, application defined link types and application provided link maker programs executed by application provided link maker processes 16 are for extending and/or customizing the link types supported by the apparatus for extensible inter-application link management of the present invention 10. Similar to the navigation and include link types, application defined link types are defined via object type definitions 36. Likewise, application provided link maker programs are defined via program type definitions 38. The include link type may be considered as an exemplary "extension" of the navigation link type (see FIG. 2b).

Similar to the include link type, the object type definitions 36 for the application defined link types may inherit linking operation requests and notices handled/observed with or without override. The inherited linking operation requests and notices handled/observed may be inherited from the navigation link type, the include link type or other already defined application defined link types. The non-overridden inherited linking operation requests and notices will be handled/observed by the predecessor link maker programs, i.e. the navigation link maker program, the include link maker program and the existing application provided link maker programs. The overridden inherited linking operation requests and notices will be handled/observed by the new application provided link maker programs before being handled/observed by the predecessor link maker programs.

Unlike the include link type, the object type definitions 36 for the application defined link types may further define new linking operation requests and notices handled/observed by the new application provided link maker programs.

Similar to the navigation and include link maker programs, the program type definitions 38 for the application provided link maker programs define the start up instructions for the application provided link maker programs. Similar to the navigation link maker program, the program type definitions 38 for the application provided link maker programs may further define object type independent message signatures handled/observed by the application provided link maker programs.

The object type and program type definitions 36, 38 for the application defined link type and application provided link maker programs are similarly merged into new and/or existing merged object type-program type definitions 34 and made accessible to the switches 32.

Similar to the linking operation requests and notices defined for the navigation and include link types, the newly defined linking operations may be requested and/or notified via request and notice messages comprising similar message attributes. The request and notice messages will be delivered to the existing or new application provided link maker programs based on the content of the request/notice message and the updated merged object type-program type definitions. Upon receipt of the requests and notices, they may be handled/observed accordingly by the existing or new application provided link maker programs.

5. ANCHOR TYPE AND ANCHOR MAKER PROCESS

Referring now to FIG. 2c, a block diagram illustrating the object type definition for an exemplary anchor type "Novacell" 120, and the program type definition for an exemplary anchor maker program "Nova" 140 executed by an exemplary anchor maker process is shown. An anchor type definition 120 defines the linking operation notices observed 122-126 and the anchor manipulation operation requests and notices handled/observed 128-134 for the particular anchor type. The anchor type definition 120 further defines the exemplary anchor making observer program(s) for the linking operation notices 122-124 and the anchor manipulating operation requests and notices 128-134 being defined. An anchor maker program definition 140 defines the start up instructions 142 and the anchor type independent message signatures (not shown) handled and observed by the particular anchor maker program being defined.

The linking operation notices observed 122-126 for the exemplary "Novacell" anchor type comprise the linking operation notice of "LinkAdded" 122, the linking operation notice of "LinkRemoved" 124 and the linking operation notice of "LinkChanged" 126. These linking operation notices are to be observed by the exemplary "Nova" anchor maker program.

The anchor manipulating operations handled 128-134 for the exemplary "Novacell" anchor type comprise the anchor manipulating operation request of "Display" 128, the anchor manipulating operation request of "Check" 130, the anchor manipulating operation request of "GetData" 132, and the anchor manipulating operation request of "PutData" 134. These anchor manipulating operation requests are to be handled by the exemplary "Nova" anchor maker program.

The start up instructions 142 for the exemplary "Nova" anchor maker program comprises the exemplary start up parameters "/usr/.../nova". The anchor type independent message signatures handled and observed may comprise any number of anchor type independent message signatures handled and observed (not shown) by the exemplary "Nova" anchor maker program.

Similar to the link types and the link maker programs, the object type definition for the exemplary "Novacell" anchor type 120, and the program type definition for the exemplary "Nova" anchor maker program 140 and other existing program type definitions for other anchor maker programs are merged into merged object type-program type definitions and made accessible to the switches (see FIG. 1).

a. LinkAdded, LinkRemoved and LinkChanged

Continuing referring to FIG. 2c, the linking operation notices of "LinkAdded" 122, "LinkRemoved" 124, and "LinkChanged" 126 for a particular anchor type, are for the navigation link maker process to notify the anchor maker process for a particular anchor type, that a link to an anchor having that particular anchor type, has been added, removed or changed. A "LinkAdded", "LinkRemoved" or "LinkChanged" linking operation notice is sent as an object oriented message scoped to a message scope of the message scope type "File". A "LinkAdded", "LinkRemoved" or "LinkChanged" linking operation notice message comprises a message identifier attribute, a message scope type attribute comprising the message scope type of "File", a message sender session attribute comprising the session identifier of the sending navigation link maker process, a message non-session scope identifier comprising a file identifier for the file containing the linked anchor, a message class attribute comprising the message class of "Request", a message object identifier attribute comprising an anchor identifier for the anchor linked, a message operation attribute comprising the object operation code of "LinkAdded", "LinkRemoved" or "LinkChanged", and a set of message argument attribute comprising a link identifier for the link added, deleted or changed.

Upon receipt of a "LinkAdded", "LinkRemoved" or "LinkChanged" linking operation notice, the observing anchor maker process updates the anchor specification (see FIG. 1) of the anchor linked. The observing anchor maker process may take further anchor type specific actions for the anchor of the particular anchor type.

b. Display

Continuing referring to FIG. 2c, the anchor manipulating operation request "Display" 128 for a particular anchor type is for the anchor maker process to display an anchor of a particular anchor type, upon the request of a link maker process or another anchor maker process. A "Display" anchor manipulating operation request is sent as an object oriented message scoped to a user session. A "Display" linking operation notice message comprise a message identifier attribute, a message scope type attribute comprising the message scope type of "Session", a message sender session attribute comprising the session identifier of the sending navigation link maker process, a message class attribute comprising the message class of "Request", a message object identifier attribute comprising an anchor identifier for the anchor to be displayed, and a message operation attribute comprising the object operation code of "Display".

Upon receipt of a "Display" anchor manipulating operation request, the handling anchor maker process loads the file containing the anchor data (see FIG. 1) and displays the anchor data. The handling anchor maker process may take further anchor type specific actions for the anchor of the particular anchor type. Upon completion of handling, the handling anchor maker process sends the handling results to the local switch, for delivery as reply to the sending include link/anchor maker process, for the "Display" anchor manipulating request.

c. Check

Continuing referring to FIG. 2c, the anchor manipulating operation request "Check" 130 for a particular anchor type is for the anchor maker process to check an anchor of a particular anchor type, upon the request of a link maker process or another anchor maker process. A "Check" anchor manipulating operation request is sent as an object oriented message scoped to a message scope of the message scope type "File". A "Check" anchor manipulating operation request message comprises a message identifier attribute, a message scope type attribute comprising the message scope type of "File", a message sender session attribute comprising the session identifier of the sending navigation link maker process, a message non-session scope identifier comprising a file identifier for the file containing the anchor to be checked, a message class attribute comprising the message class of "Request", a message object identifier attribute comprising an anchor identifier for the anchor to be checked, and a message operation attribute comprising the object operation code of "Check".

Upon receipt of the "Check" anchor manipulating operation request, the handling anchor maker process verifies the anchor specifications (see FIG. 1). The handling anchor maker process may take further anchor type specific actions for the anchor of the particular anchor type. Upon completion of handling, the handling anchor maker process sends the handling results to the, local switch, for delivery as reply to the sending include link/anchor maker process, for the "Check" anchor manipulating request.

d. GetData

Continuing referring to FIG. 2c, the anchor manipulating operation request "GetData" 132 for a particular anchor type is for the anchor maker process to retrieve the source anchor data of the particular anchor type, upon the request of a link maker process or another anchor maker process. A "GetData" anchor manipulating operation request is sent as an object oriented message scoped to a message scope of the message scope type "File". A "GetData" anchor manipulating operation request message comprises a message identifier attribute, a message scope type attribute comprising the message scope type of "File", a message sender session attribute comprising the session identifier of the sending include link/anchor maker process, a message non-session scope identifier comprising a file identifier for the file containing the source anchor data, a message class attribute comprising the message class of "Request", a message object identifier attribute comprising an anchor identifier for the source anchor, a message operation attribute comprising the object operation code of "GetData", and a message argument attribute comprising a compatible data exchange format.

The requesting link/anchor maker process obtains the compatible data exchange format for the "GetData" anchor manipulating operation request from the merged object type-program type definition for the anchor type. If more than one compatible data exchange format is supported for "GetData", the link/anchor maker process uses the first compatible data exchange format specified.

Upon receipt of a "GetData" anchor manipulating operation request, the handling anchor maker process loads the file containing the source anchor data (see FIG. 1) and retrieves the source anchor data. The handling anchor maker process may take further anchor type specific actions for the anchor of the particular anchor type. Upon completion of handling, the handling anchor maker process sends the handling results to the local switch, including the retrieved source anchor data, for delivery as a reply to the sending include link/anchor maker process, for the "GetData" anchor manipulating request.

e. PutData

Continuing referring to FIG. 2c, the anchor manipulating operation request "PutData" 132 for a particular anchor type is for the anchor maker process to write data into the destination anchor data of the particular anchor type, upon the request of an include link maker process or another anchor maker process. A "PutData" anchor manipulating operation request is sent as an object oriented message scoped to a message scope of the message scope type "File". A "PutData" anchor manipulating operation request message comprises a message identifier attribute, a message scope type attribute comprising the message scope type of "File", a message sender session attribute comprising the session identifier of the sending include link/anchor maker process, a message non-session scope identifier comprising a file identifier for the file containing the destination anchor data, a message class attribute comprising the message class of "Request", a message object identifier attribute comprising an anchor identifier for the destination anchor, a message operation attribute comprising the object operation code of "PutData", and a message argument attribute comprising a compatible data exchange format and data to be written into the destination anchor.

Similar to the "GetData" anchor manipulating operation request, the requesting link/anchor maker process obtains the compatible data exchange format for the "PutData" anchor manipulating operation request from the merged object type-program type definition for the anchor type. Likewise, if more than one compatible data exchange format is supported for "PutData", the link/anchor maker process uses the first compatible data exchange format specified.

Upon receipt of a "PutData" anchor manipulating operation request, the handling anchor maker process loads the file containing the destination anchor data (see FIG. 1) and writes the data received into the destination anchor data. The handling anchor maker process may take further anchor type specific actions for the anchor of the particular anchor type. Upon completion of handling, the handling anchor maker process sends the handling results to the local switch for delivery as reply to the sending include link/anchor maker process, for the "PutData" anchor manipulating request.

6. LINK SPEC AND LINK RECORD

Referring back to FIG. 1, a link object 25 comprises a specification (spec) portion 26 and a data portion 27. The specification portion 26 is for describing the "housekeeping" information of the link object 25. The data portion 27 is for describing the link itself. The specification portion 26 comprises a plurality of link specs, and the data portion 27 comprise a plurality of link records.

Referring now to FIG. 3, a block diagram illustrating a link spec 150 and a link record 160 is shown. A link spec 150 comprises a plurality of spec attributes 152–156. The spec attributes comprise an object type attribute 152 comprising an object type, e.g. navigation link, a file identifier attribute 154 comprising a file identifier for the file containing the link record, and a creator attribute 156 comprising an identifier for user who created the link.

A link record 160 comprises a plurality of fields 164–168. The link record fields comprise a link identifier 162, a list of link properties 164, e.g. no source, no destination, a list of application defined extended link properties 166, and at least one linked anchor 168. Each linked anchor 168 comprises an anchor identifier and an end type, i.e. a source anchor or a destination anchor.

7. MESSAGE ROUTING FOR NAVIGATION LINKS

Referring now to FIG. 4, a block diagram summarizing the routing of linking operation request messages, linking operation notice messages and anchor manipulating notice messages for navigation links is shown. The message references 52-1, 52-2, 54-1, 54-2, 56-1, 56-2, 58-1, 58-2 relate to the message references 52, 54, 56, 58 in FIG. 1. Similarly, the process references 12-1, 12-2, 14-1, 16-1, 42-1, 42-2 relate to the process references 12, 14, 16, 42 in FIG. 1.

Initially, "Create", "Delete", and "Update" linking operation request messages 52-1 are sent from anchor maker processes 42-1 to a local switch 32. These "Create", "Delete", and "Update" linking operation request messages 56-1 are delivered to the local navigation link maker process 12-1 to handle.

Upon handling each of these "Create", "Delete", and "Update" linking operation request messages 56-1, the local navigation link maker process 12-1 sends "LinkAdded", "LinkRemoved" or "LinkChanged" linking operation notice messages 58-1. Copies of these "LinkAdded", "LinkRemoved", and "LinkChanged" linking operation notice messages 54-1 are delivered to any number of local/remote anchor maker observer processes 42-2. One copy of each of these "LinkAdded", "LinkRemoved", and "LinkChanged" linking operation notice messages 54-1 may be delivered to a local/remote anchor maker process (remote not shown) to handle. Delivery to a remote anchor maker process is through a joined switch (not shown) local to the remote anchor maker process. For further information on remote delivery, see the referenced Specifications.

Additionally, upon handling each of these "Create", "Delete", and "Update" linking operation request messages 56-1, the local navigation link maker process 12-1 sends the handling result 58-2 to the local switch 32. The local switch 32 generates a reply message 54-2 for each of the handling results received, and sends the reply message 54-2 to the sending anchor maker process 42-1.

Similarly, "Check" linking operation request messages 52-1 are sent from anchor maker processes 42-1 to a local switch 32. These "Check" linking operation request messages 56-1 are delivered to the local navigation link maker process 12-1 to handle.

Upon handling each of these "Check" linking operation request messages 56-1, the local navigation link maker process 12-1 sends the handling result 58-2 to the local switch 32. The local switch 32 generates a reply message 54-2 to each of the "Check" linking operation request messages 56-1 based on the handling results received, and sends the reply message 54-2 to the sending anchor maker process 42-1.

Likewise, "Follow" linking operation request messages 52-1 are sent from anchor maker processes 42-1 to a local switch 32. These "Follow" linking operation request messages 56-1 are delivered to the local navigation link maker process 12-1 to handle.

Upon handling each of these "Follow" linking operation request messages 56-1, the local navigation link maker process 12-1 addresses a "Display" anchor manipulating operation request message 58-1 to each anchor at the other end of the link and sends these "Display" messages to the local switch 32. These "Display" anchor manipulating operation request messages 54-1 are delivered to local anchor maker processes 42-2 to handle.

Upon handling each of these "Display" anchor manipulating operation request messages 54-1, the local anchor maker processes 42-2 send the handling results to the local switch 32. The local switch 32 generates a reply message 54-2 to each of the "Display" anchor manipulating operation request messages 54-1 based on the handling results received, and sends the reply message 56-1 to the sending navigation link maker process 12-1.

Upon receipt of replies to all "Display" anchor manipulating operation request messages 56-1, the local navigation link maker process 12-1 sends the handling result for the "Follow" linking operation request message 58-2 to the local switch 32. The local switch 32 generates a reply message 54-2 to the "Follow" linking operation request message 58-2 based on the handling results received, and sends the reply message 56-1 to the sending anchor maker process 42-1.

The "ObjChanged" and "ObjDeleted" anchor manipulating operation notice messages 52-1 are also sent from anchor maker processes 42-1 to a local switch 32. These "ObjChanged" and "ObjDeleted" anchor manipulating operation request messages 56-1 are delivered to the local navigation link maker process 12-1 to handle.

Upon handling each of these "ObjChanged" and "ObjDeleted" anchor manipulating operation request messages 56-1, the local navigation link maker process 12-1 addresses an "EndChanged" or "EndDeleted" linking operation notice message 58-1 to each link whose anchors are changed or deleted, and sends the "EndChanged" or "EndDeleted" messages to the local switch 32. These "EndChanged" and "EndDeleted" linking operation notice messages 56-1 for navigation links are delivered to the local navigation link maker process 12-1 to handle. These "EndChanged" and "EndDeleted" linking operation notice messages 56-1 for other link type are also delivered to the appropriate local link maker process (not shown) to handle.

8. MESSAGE ROUTING FOR INCLUDE LINKS

Referring now to FIG. 5, a block diagram summarizing the routing of linking operation request messages, linking operation notice messages and anchor manipulating notice messages for include links is shown. The message references 52-1, 52-2, 54-1, 54-2, 56-1, 56-2, 58-1 to 58-4 relate to the message references 52, 54, 56, 58 in FIG. 1. Similarly, the process references 12-1,14-1, 42-1, 42-2 relate to the process references 12, 14, 42 in FIG. 1.

Initially, "Create" linking operation request messages 52-1 are sent from anchor maker processes 42-1 to a local switch 32. These "Create" linking operation request messages 56-1 are delivered to the local include link maker process 14-1 to handle.

Upon "preprocessing" each of these "Create" linking operation request messages 56-1, the local include link maker process 14-1 sends a new "Create", linking operation request message 58-1 to the local switch 32, with the predecessor attribute set to "True". This new "Create" linking operation request message 56-2 is delivered to the local navigation link maker process 12-1 to handle.

Upon handling each of these new "Create" linking operation request messages 56-2, the local navigation link maker process 12-1 sends "LinkAdded" linking operation notice messages 58-3 and the handling result 58-4 to the local switch 32. Copies of the "LinkAdded" linking operation notice messages 58-3 are selectively routed in the same manner as previously described for the navigation links. The local switch 32 generates a reply message 56-1 to each of the new "Create" linking operation request messages 56-2 based on the handling results received, and sends the reply message 56-1 to the sending include link maker process 14-1.

Upon receipt of the reply message 56-1 to each of the new "Create" linking operation request message 58-1, the include link maker process 14-1 sends a GetData request 58-1 to the new link source anchor. Upon receiving the GetData reply 56-1, the include link maker sends PutData requests 58-1 to each of the new links destination anchors. Upon receiving the final reply to the PutData messages 56-1, the include link sends the handling result 58-2 for the original "Create" linking operation request message to the local switch 32. The local switch 32 generates a reply message 54-2 to each of the signal "Create" linking operation request message based on the handling results received, and sends the reply message 54-2 to the sending anchor maker process 42-1.

Similarly, "Delete", "Update", "Follow" and "Check" linking operation request messages 52-1 are sent from anchor maker processes 42-1 to a local switch 32. These "Delete", "Update", "Follow" and "Check" linking operation request messages 56-2 are delivered to the local navigation link maker process 12-1 to handle. The resulting "LinkRemoved"/"LinkChanged" linking operation notice messages 58-3, "Display" anchor manipulating request messages 58-3 and handling results 58-4 for these "Delete", "Update", "Follow" and "Check" linking operation request messages 56-2 for the include links, are routed in the same manner as previously described for the navigation links.

As described earlier, the "ObjChanged" and "ObjDeleted" anchor manipulating operation notice messages 52-1 are also sent from anchor maker processes 42-1 to a local switch 32. These "ObjChanged" and "ObjDeleted" anchor manipulating operation request messages 56-2 are delivered to the local navigation link maker process 12-1 to handle.

Upon handling each of these "ObjChanged" and "ObjDeleted" anchor manipulating operation request messages 56-2, the local navigation link maker process 12-1 addresses an "EndChanged" or "EndDeleted" linking operation notice message 58-3 to each link where anchors are changed or deleted, and sends the "EndChanged" or "EndDeleted" messages to the local switch 32. These "EndChanged" linking operation notice messages 56-1 for include links are delivered to the local include link maker process 14-1 to handle. These "EndDeleted" linking operation notice messages 56-2 for include links are delivered to the local navigation link maker process 12-1 to handle.

Upon handling each of these "EndChanged" linking operation request message 56-1, the include link maker process 14-1 addresses a "GetData" anchor manipulating operation request message 58-1 to the changed source anchor and sends the "GetData" message to the switch 32. These "GetData" anchor manipulating operation request messages 54-1 are delivered to local/remote anchor maker processes 42-2 to handle.

Upon handling a "GetData" anchor manipulating operation request message 54-1, the local/remote anchor maker process 42-2 sends the handling results 52-2 to its local switch 32. The local switch 32 generates a reply message 56-1 and sends the reply message 56-1 to the sending local include link maker process 14-1.

Upon receipt of a reply message 56-1 to a "GetData" anchor manipulating operation request message 58-1, the local include link maker process 14-1 addresses a "PutData" anchor manipulating operation request message 58-1 to each of the destination anchors and sends these "PutData" messages to the local switch 32. These "PutData" anchor manipulating operation request messages 54-1 are delivered to local/remote anchor maker processes 42-2 to handle.

Upon handling a "PutData" anchor manipulating operation request message 54-1, the local/remote anchor maker process 42-2 sends the handling results 52-2 to the local switch 32. The local switch 32 generates a reply message 56-1 and sends the reply message 56-1 to the sending local include link maker process 14-1.

9. MESSAGE ROUTING FOR ANCHORS

Referring now to FIG. 6, a block diagram summarizing the routing of anchor manipulating request messages for anchors is shown. The process references 42-1, 42-2 relate to the process references 42 in FIG. 1.

Initially, "Check" linking operation request messages 52 are sent from anchor maker processes 42-1 to a local switch 32. These "Check" linking operation request messages 56 are delivered to a local/remote anchor link maker process (remote not shown) 42-2 to handle.

Upon handling each of these "Check" linking operation request messages 56, the local/remote anchor link maker process 42-2 sends the handling result 58 to the local switch 32. Handling results from a remote anchor maker process is sent through a joined switch (not shown) local to the remote anchor making process. The local switch 32 generates a reply message 54 to each of the "Check" linking operation request message 56 based on the handling results received, and sends the reply message 54 to the sending anchor maker process 42-1.

10. VARIATIONS

While the apparatus for extensible inter-application link management of the present invention has been described in terms of a preferred embodiment, it will be understood that the present invention is not limited to the link types and the link maker processes discussed herein. The present invention is also not limited to processes executing on different computers communicating across a network. Those skilled in the art will recognize that the invention can be practiced with modification and alteration within the spirit and scope of the appended claims to serve a wide variety of object oriented interprocess communication situations for processes being executed by the same computer and for processes being executed by different computers in a network.

What is claimed is:

1. A computer-implemented method for managing inter-application linking of data objects in an extensible manner within an object-oriented computer system, said computer system comprising a plurality of message switches and a plurality of applications having a plurality of processes and a plurality of data objects, said plurality of data objects including a plurality of anchor objects, said method comprising the steps of:
   (a) a first plurality of anchor maker processes sending a first plurality of linking operation requests as a first plurality of object-oriented (o-o) messages to a message switch, said first plurality of o-o messages being specifically addressed to a first plurality of link objects, said first plurality of link objects linking said data objects in a first linkage relationship, said first plurality of link objects being target objects of said first plurality of linking operation requests, and Said first plurality of link objects having a first pre-determined link object type;
   (b) said message switch delivering said first plurality of o-o messages to a first link maker process, said first link maker process being part of an inter-application link manager supporting said first predetermined link object type; and
   (c) said first link maker process handling said first plurality of link operation requests targeted for said first plurality of link objects in response to said first plurality of o-o messages received from said message switch.

2. The method as set forth in claim 1, wherein,
said step (a) further includes a second plurality of anchor maker processes sending a first plurality of anchor manipulating operation notices as a first plurality of non-object-oriented (n-o-o) messages to said message switch, said first plurality of n-o-o messages being generally addressed to processes interested in receiving such messages;
said step (b) further includes said message switch delivering said first plurality of n-o-o messages to said first link maker process for having previously expressed interest in receiving such messages; and
said step (c) further includes said first link maker process observing said first plurality of anchor manipulating operation notices responsive to said first plurality of n-o-o messages received from said switch.

3. The method as set forth in claim 2, wherein, said method further comprises the steps of:
   (d) said first link maker process sending a first plurality of linking operation notices as a second plurality of o-o messages to said switch, said second plurality of o-o messages being specifically addressed to a second plurality of link objects linking said data objects in said first linkage relationship, said second plurality of link objects being target objects of said first plurality of linking operation notices and having said first predetermined link object type;
   (e) said message switch delivering said second plurality of o-o messages to said first link maker process; and
   (f) said first link maker process observing said first plurality of link operation notices targeted for said second plurality of link objects responsive to said second plurality of o-o messages received from said message switch.

4. The method as set forth in claim 1, wherein,
said step (a) further includes a second plurality of anchor maker processes sending a second plurality of linking operation requests as a second plurality of o-o messages to said switch, said second plurality of o-o messages being specifically addressed to a second plurality of link objects linking said data objects in a second linkage relationship, said second plurality of link objects being target objects of said second plurality of linking operation requests and having a second predetermined link object type;
said step (b) further includes said message switch delivering said second plurality of o-o messages to said first link maker process, said first predetermined link object type being a predecessor object type of said second predetermined link object type from which said second predetermined link object type inherits linking operations of said second linking operation requests without override; and
said step (c) further includes said first link maker process handling said second plurality of link operation requests targeted for said second plurality of link objects responsive to said second plurality of o-o messages received from said message switch.

5. The method as set forth in claim 4, wherein,
said first link maker process of said inter-application link manager supporting said first predetermined link object type is supplied by a vendor of said inter-application link manager; and
said second link maker process of said inter-application link manager supporting said second predetermined link object type is subsequently added to said inter-application link manager by a non-vendor to extend predetermined link types supported by said inter-application link manager.

6. The method as set forth in claim 1, wherein,
said step (a) further includes a second plurality of anchor maker processes sending a second plurality of linking operation requests as a second plurality of o-o messages to said switch, said second plurality of o-o messages being specifically addressed to a second plurality of link objects linking said data objects in a second linkage relationship, said second plurality of link objects being target objects of said second plurality of linking operation requests and having a second predetermined link object type;

said step (b) further includes said message switch delivering said second plurality of o-o messages to a second link maker process of said inter-application link manger supporting said second predetermined link object type, said first predetermined link object type being a predecessor object type of said second predetermined link object type from which said second predetermined link object type inherits linking operations of said second linking operation requests with override; and said step (c) further includes said second link maker process partially handling said second plurality of link operation requests targeted for said second plurality of link objects responsive to said second plurality of o-o messages received from said message switch.

7. The method as set forth in claim 6, wherein, said method further comprises the steps of:
(d) said second link maker process sending a first plurality of anchor manipulating operation requests as a third plurality of o-o messages to said switch, said third plurality of o-o messages being specifically addressed to a first plurality of anchor data objects and having a first plurality of anchor object types;
(e) said message switch delivering said third plurality of o-o messages to a third plurality of anchor maker processes supporting said first plurality of anchor types; and
(f) said third plurality of anchor maker processes handling said first plurality of anchor manipulating operation requests targeted for said first plurality of anchor data objects responsive to said third plurality of o-o messages received from said message switch.

8. The method as set forth in claim 7, wherein, said method further comprises the steps of:
(g) said second link maker process re-sending said second plurality of linking operation requests as a fourth plurality of o-o messages to said switch, said fourth plurality of o-o messages being specifically addressed to said second plurality of link objects linking said data objects in said second linkage relationship, said fourth plurality of o-o messages further having qualifying message attributes denoting delivery to be made based on said second predetermined link object type's predecessor predetermined link object type;
(h) said message switch delivering said fourth plurality of o-o messages to said first link maker process; and
(i) said first link maker process residually handling said second plurality of link operation requests targeted for said second plurality of link objects responsive to said fourth plurality of o-o messages received from said message switch.

9. The method as set forth in claim 6, wherein,
said first link maker process of said inter-application link manager supporting said first predetermined link object type is supplied by a vendor of said inter-application link manager; and
said second link maker process of said inter-application link manager supporting said second predetermined link object type is subsequently added to said inter-application link manager by a non-vendor to extend predetermined link types supported by said inter-application link manager.

10. The method as set forth in claim 1, wherein, said step (a) further includes a second plurality of anchor maker processes sending a first plurality of anchor manipulating operation notices as a first plurality of non-object-oriented (n-o-o) messages to said message switch, said first plurality of n-o-o messages being generally addressed to processes interested in receiving such messages;

said step (b) further includes said message switch delivering said first plurality of n-o-o messages to said first link maker process for having previously expressed interest in receiving such messages;

said step (c) further includes said first link maker process observing said first plurality of anchor manipulating operation notices responsive to said first plurality of n-o-o messages received from said switch;

said method further comprises the steps of:
(d) said first link maker process sending a first plurality of linking operation notices as a second plurality of o-o messages to said switch, said second plurality of o-o messages being specifically addressed to a second plurality of link objects linking said data objects in a said second linkage relationship, said second plurality of link objects being target objects of said first plurality of linking operation notices and having a second predetermined link object type,
(e) said message switch delivering said second plurality of o-o messages to said first link maker process, said first predetermined link object type being a predecessor object type of said second predetermined link object type from which said second predetermined link object type inherits linking operations of said first plurality of linking operation notices without override;
(f) said first link maker process observing said first plurality of link operation notices targeted for said second plurality of link objects responsive to said second plurality of o-o messages received from said message switch.

11. The method as set forth in claims 10, wherein,
said first link maker process of said inter-application link manager supporting said first predetermined link object type is supplied by a vendor of said inter-application link manager; and
said second link maker process of said inter-application link manager supporting said second predetermined link object type is subsequently added to said inter-application link manager by a non-vendor to extend predetermined link types supported by said inter-application link manager.

12. The method as set forth in claim 1, wherein,
said step (a) further includes a second plurality of anchor maker processes sending a first plurality of anchor manipulating operation notices as a first plurality of non-object-oriented (n-o-o) messages to said message switch, said first plurality of n-o-o messages being generally addressed to processes interested in receiving such messages;

said step (b) further includes said message switch delivering said first plurality of n-o-o messages to said first link maker process for having previously expressed interest in receiving such messages;

said step (c) further includes said first link maker process observing said first plurality of anchor manipulating operation notices responsive to said first plurality of n-o-o messages received from said switch; said method further comprises the steps of:

(d) said first link maker process sending a first plurality of linking operation notices as a second plurality of o-o messages to said switch, said second plurality of o-o messages being specifically addressed to a second plurality of link objects linking said data objects in a said second linkage relationship, said second plurality of link objects being target objects of said first plurality of linking operation notices and having a second predetermined link object type, (e) said message switch delivering said second plurality of o-o messages to a second link maker process of said inter-application linking manager supporting said second predetermined link object type, said first predetermined link object type being a predecessor object type of said second predetermined link object type from which said second predetermined link object type inherits linking operations of said first plurality of linking operation notices with override;

(f) said second link maker process partially observing said first plurality of link operation notices targeted for said second plurality of link objects responsive to said second plurality of o-o messages received from said message switch.

13. The method as set forth in claim 12, wherein the method further comprises the steps of:

(g) said second link maker process sending a second plurality of linking operation notices as a third plurality of o-o messages to said switch, said third plurality of o-o messages being specifically addressed to a third plurality of link objects linking said data objects in said second linkage relationship, said third plurality of link objects being target objects of said second plurality of linking operation notices and having said second predetermined link object type, said third plurality of o-o messages further having qualifying message attributes denoting delivery to be made based on said second predetermined link object type's predecessor predetermined link object type;

(h) said message switch delivering said third plurality of o-o messages to said first link maker process;

(i) said first link maker process residually observing said second plurality of link operation notices targeted for said third plurality of link objects responsive to said third plurality of o-o messages received from said message switch.

14. The method as set forth in claim 12, wherein,
said first link maker process of said inter-application link manager supporting said first predetermined link object type is supplied by a vendor of said inter-application link manager; and
said second link maker process of said inter-application link manager supporting said second predetermined link object type is subsequently added to said inter-application link manager by a non-vendor to extend predetermined link types supported by said inter-application link manager.

15. The method as set forth in claim 1, wherein,
said step (a) further includes a second plurality of anchor maker processes sending a second plurality of linking operation requests as a second plurality of o-o messages to said switch, said second plurality of o-o messages being specifically addressed to a second plurality of link objects linking said data objects in a second linkage relationship, said second plurality of link objects being target objects of said second plurality of linking operation requests and having a second predetermined link object type;

said step (b) further includes said message switch delivering said second plurality of o-o messages to a second link maker process of said inter-application link manager supporting said second predetermined link object type; and said step (c) further includes said second link maker process handling said second plurality of link operation requests targeted for said second plurality of link objects responsive to said second plurality of o-o messages received from said message switch.

16. The method as set forth in claim 15, wherein,
said first link maker process of said inter-application link manager supporting said first predetermined link object type is supplied by a vendor of said inter-application link manager; and
said second link maker process of said inter-application link manager supporting said second predetermined link object type is subsequently added to said inter-application link manager by a non-vendor to extend predetermined link types supported by said inter-application link manager.

17. The method as set forth in claim 1, Wherein,
said step (a) further includes a second plurality of anchor maker processes sending a first plurality of anchor manipulating operation notices as a first plurality of non-object-oriented (n-o-o) messages to said message switch, said first plurality of n-o-o messages being generally addressed to processes interested in receiving such messages;

said step (b) further includes said message switch delivering said first plurality of n-o-o messages to said first link maker process for having previously expressed interest in receiving such messages;

said step (c) further includes said first link maker process observing said first plurality of anchor manipulating operation notices responsive to said first plurality of n-o-o messages received from said switch.;

said method further comprises the steps of:

(d) said first link maker process sending a first plurality of linking operation notices as a second plurality of o-o messages to said switch, said second plurality of o-o messages being specifically addressed to a second plurality of link objects linking said data objects in a said second linkage relationship, said second plurality of link objects being target objects of said first plurality of linking operation notices and having a second predetermined link object type, (e) said message switch delivering said second plurality of o-o messages to a second link maker process of said inter-application linking manager supporting said second predetermined link object type;

(f) said second link maker process observing said first plurality of link operation notices targeted for said second plurality of link objects responsive to said second plurality of o-o messages received from said message switch.

18. The method as set forth in claim 17, wherein,
said first link maker process of said inter-application link manager supporting said first predetermined link object type is supplied by a vendor of said inter-application link manager; and said second link maker process of said inter-application link manager supporting said second predetermined link object type is subsequently added to said inter-application link manager by a non-vendor to extend predetermined link types supported by said inter-application link manager.

19. The method as set forth in claim 1, wherein, said method further comprises the steps of:
   (d) said first link maker process sending a first plurality of linking operation notices as a second plurality of o-o messages to said switch, said second plurality of o-o messages being specifically addressed to a first plurality of anchor data objects, said first plurality of anchor data objects being target objects of said first plurality of linking operation notices and having a first plurality of anchor types;
   (e) said message switch delivering said second plurality of o-o messages to a second plurality of anchor maker processes supporting said first plurality of anchor types; and
   (f) said second plurality of anchor maker processes observing said first plurality of link operation notices targeted for said first plurality of anchor objects responsive to said second plurality of o-o messages received from said message switch.

20. The method as set forth in claim 1, wherein,
   said step (a) further includes said first link maker process sending a first plurality of anchor manipulating operation requests as a second plurality of object-oriented (o-o) messages to said message switch, said second plurality of o-o messages being specifically addressed to a first plurality of anchor data objects, said first plurality of anchor data objects being target objects of said first plurality of anchor operation requests and having a first plurality of anchor types;
   said step (b) further includes said message switch delivering said second plurality of o-o messages to a second plurality of anchor maker processes supporting said first plurality of anchor types; and
   said step (c) further includes said second plurality of anchor maker process handling said first plurality of anchor manipulating operation requests responsive to said second plurality of o-o messages received from said switch.

* * * * *